United States Patent Office 3,813,374
Patented May 28, 1974

3,813,374
POLYMERIZATION OF CONJUGATED DIOLEFINS WITH CATALYSTS CONTAINING CARBON OXYSULFIDE
Dale C. Perry, Akron, Ohio, assignor to The Goodyear Tire & Rubber Company, Akron, Ohio
No Drawing. Filed Oct. 19, 1970, Ser. No. 82,189
Int. Cl. C08d 3/04, 3/06, 1/14
U.S. Cl. 260—94.3
10 Claims

ABSTRACT OF THE DISCLOSURE

There is disclosed a process for the polymerization of conjugated diolefins by means of a catalyst system comprising (A) titanium tetrachloride (B) at least one member of the group consisting of (1) organoaluminum compounds defined by the formula:

wherein $R_1$ is selected from the group consisting of alkyl, cycloalkyl, aryl, alkaryl, arylalkyl and halogen radicals and hydrogen and $R_2$ and $R_3$ are selected from the group consisting of alkyl, cycloalkyl, aryl, arylalkyl and alkaryl radicals and (2) the etherates of organoaluminum compounds of the formula:

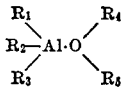

wherein $R_1$ is selected from the group consisting of alkyl, cycloalkyl, aryl, alkaryl, arylalkyl and halogen radicals and hydrogen; $R_2$ and $R_3$ are selected from the group consisting of alkyl, cycloalkyl, aryl, arylalkyl and alkaryl radicals; $R_4$ and $R_5$ are selected from the group consisting of saturated aliphatic, unsaturated aliphatic, saturated alicyclic, unsaturated alicyclic and aromatic radicals and (C) carbon oxysulfide.

This invention relates to the polymerization of conjugated diolefins. More particularly, it relates to the polymerization of conjugated diolefins and mixtures thereof with an improved catalyst system.

It has been discovered that certain synthetic polymers which contain a high degree of stereoregularity exhibit certain desirable physical and chemical properties. Processes for their preparation are known. For instance, aluminum trialkyls, such as aluminum triisobutyl and the like, when reacted with titanium tetrachloride will produce catalysts which, when used to polymerize conjugated diolefins, cause the formation of polymers which contain a high degree of stereospecificity. It is also known that aluminum trialkyl etherates of both aromatic and aliphatic ethers, such as triisobutylaluminum diphenyl etherate or triisobutylaluminum diethyl etherate, when reacted with titanium tetrachloride, will produce catalysts which, when used to polymerize isoprene and the like, will produce a synthetic polymer having physical and chemical characteristics similar to natural rubber.

However, certain of these aforementioned polymerization processes are subject to certain deficiencies. One of the most serious deficiencies is in the formation of undesirable by-products during the polymerization. Another difficulty encountered is that the catalyst composition requirements to achieve a high degree of stereo regularity in the polymer is very stringent. If the catalyst components are not controlled within certain very narrow ratios to each other, the catalyst will produce a low yield for a given amount of catalyst or the products obtained would contain a very large amount of deleterious by-products.

Therefore, it is the object of this invention to provide a process which will produce synthetic polymers from conjugated diolefins exhibiting a high degree of stereospecificity and, at the same time, essentially free of undesirable by-products. Another objective is to provide a process in which the rather stringent requirements of catalyst compositions can be made less stringent. Other objects will appear as the description proceeds.

In the preceding paragraph, reference has been made to terms of unwanted by-products. These unwanted by-products which effect the degree of specificity are extractable from the polymers in certain selected solvents. For instance, it has been determined that employing these prior art processes, polymers formed contain considerable amounts of a material which is polymeric in nature but is soluble in a 1/1 volume ratio of isopropyl alcohol/hexene mixture. These extractables are believed to be low molecular weight cyclic materials and account for a lowering of the chemical and physical characteristics of the polymer.

It has now been discovered that the polymerization of at least one conjugated diolefin by means of a catalyst system comprising (A) titanium tetrachloride and (B) at least one member of the group of (1) the organoaluminum compounds of the formula:

wherein $R_1$ is selected from the group consisting of alkyl, cycloalkyl, aryl, alkaryl, arylalkyl and halogen radicals and hydrogen and $R_2$ and $R_3$ are selected from the group consisting of alkyl, cycloalkyl, aryl, arylalkyl and alkaryl radicals and (2) the etherates of organoaluminum compounds of the formula:

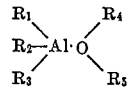

wherein $R_1$ is selected from the group consisting of alkyl, cycloalkyl, aryl, alkaryl, arylalkyl and halogen radicals and hydrogen; $R_2$ and $R_3$ are selected from the group consisting of alkyl, cycloalkyl, aryl, alkaryl, arylalkyl radicals; $R_4$ and $R_5$ are selected from the group consisting of saturated aliphatic, unsaturated aliphatic, saturated alicyclic, unsaturated alicyclic and aromatic radicals and (C) carbon oxysulfide (COS) also known as carbonyl sulfide.

The ethers which form a part of the organoaluminum etherate compounds may be defined by the formula:

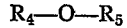

$$R_4—O—R_5$$

wherein $R_4$ and $R_5$ can be saturated aliphatic, unsaturated aliphatic, saturated alicyclic, unsaturated alicyclic and aromatic radicals. Representative of these ethers are diphenyl ether, dinaphthyl ether, anisole, phenetole, para methyl anisole, diethyl ether, dibutyl ether, diamyl ether, methyl tolyl ether, dihexyl ether, dioctyl ether, cyclohexyl phenyl ether, amyl phenyl ether, ditolyl ether, and the like.

The ethers employed in this invention may contain more than one ethereal oxygen. If such an ether is employed to form the organoaluminum etherate, the amount of ether should be based on the C—O—C contained.

The organoaluminum etherates of this invention may be prepared by conventional procedure. They may be prepared by directly reacting such materials as an aluminum magnesium alloy with an alkyl halide in the presence of the particular ether. Another method to prepare the organoaluminum etherates is to mix approximately equal molar quantities of the desired ether with the desired organoaluminum compound. When prepared in this manner, they are usually dissolved in a hydrocarbon solvent.

The titanium tetrachloride employed as a catalyst in this invention does not require any special discussion except to say that it should be anhydrous and as pure as possible.

The carbon oxysulfide used in this invention does not require any special discussion except that it should be anhydrous and as pure as possible.

The conjugated diolefins to which this invention is directed are diolefins such as butadiene-1,3 and the 2-alkyl-substituted butadienes wherein the alkyl radical in the 2 position contains from 1 to about 8 carbon atoms. Representative of these 2-alkyl-1,3-butadienes are 2-methyl-1,3-butadiene, more generally known as isoprene; 2-ethyl-1,3-butadiene; 2-propyl-1,3-butadiene; 2-isopropyl-1,3-butadiene; 2-butyl-1,3-butadiene; 2-isobutyl-1,3-butadiene; 2-amyl-1,3-butadiene; 2-isoamyl-1,3-butadiene; 2-hexyl-1,3-butadiene; 2-cyclohexyl-1,3-butadiene; 2-isohexyl-1,3-butadiene; 2-heptyl-1,3-butadiene; 2-isoheptyl-1,3-butadiene; 2-octyl-1,3-butadiene and 2-isooctyl-1,3-butadiene. Mixtures of these diolefins may also be employed.

In general, the conjugated diolefins which are polymerized in accordance with this invention are usually polymerized while dissolved in an inert solvent or diluent. Inert solvent or diluent—whenever employed—is meant that the diluent does not adversely affect the properties of the resulting polymer nor have any adverse effect on the activity of the catalyst. Suitable inert solvents are usually hydrocarbons, examples of which are pentane, hexane, heptane and the like, cyclohexane, benzene, toluene and xylene. Mixtures may also be employed as well as substituted hydrocarbons so long as the substituents do not adversely affect the polymerization system.

When an inert diluent is employed, the diluent monomer ratio is not critical and may vary widely. For instance, up to 20 or more/1 have been found successful. Volume ratios of solvent to monomer usually employed from about 3/1 to about 6/1. Polymerizations may be carried out without the use of solvents by a technique known as bulk polymerization. Batch or continuous polymerizations may be employed.

In conducting the polymerization of this invention, it is usually desirable to employ air-free and moisture-free techniques.

The temperatures employed in this invention are not critical and may vary widely from, for instance, —50° C. up to about 120° C. However, it is usually more convenient to employ temperatures ranging from about 10° C. to about 80° C.

The mole ratios of the various components of the catalyst of this invention may vary. For instance, in the polymerization of butadiene, the aluminum to titanium (Al/Ti) mole ratio has been employed from 0.7/1 to about 7/1. It is more preferred to employ from about 2/1 to about 4/1. When 2-alkyl-substituted butadiene, such as isoprene, is polymerized, the mole ratio may be varied from an Al/Ti of about 0.3/1 to about 1.5/1, with 0.6/1 to 0.9/1 being more preferred.

The amount of carbon oxysulfide which may be employed in this invention can vary fairly widely. Of course, sufficient COS should be employed to obtain a beneficial result. The lower limit has been found to be about 0.01/1 calculated as the mole ratio of carbon oxysulfide to titanium (COS/Ti). A more optimum ratio seems to be 0.10/1 to 10/1. If more than about 50 moles of COS to one mole of titanium is employed, the activity of the catalyst is diminished.

The catalyst of this invention may be prepared in almost any manner. For instance, they may be utilized as in situ catalyst, that is, each catalyst component added to a mixture of the monomer and solvent, if any, individually or they may be preformed, that is, the catalyst components premixed prior to contacting the monomers.

The catalyst components may be mixed at temperatures varying from extremes, such as —40° C. to 80° C., usually from 10° C. to 30° C.

The amount of total catalyst employed, of course, depends on certain factors, such as rate desired, temperatures employed and the like. Obviously sufficient catalyst must be employed to cause the polymerization to take place but there is no theoretical upper limit. It has been determined that a practical catalyst concentration may vary broadly from about 0.01 to about 3 or 4 parts by weight calculated as titanium per hundred of monomer.

The pressures employed in the practice of this invention are usually ambient pressures, but both super- and sub-atmospheric pressure may be utilized.

The practice of this invention is further illustrated by reference to the following examples which are intended to be representative rather than restrictive of the scope of this invention.

EXAMPLE I

In this example a series of experiments were performed employing aluminum triisobutyl diphenyl etherate and titanium tetrachloride at a mole ratio of Al/Ti of 1/1. Varying amounts of carbon oxysulfide were utilized. The catalyst components were injected individually into each polymerization which consisted of a mixture of 10 grams of isoprene in 40 grams of pentane. The amount of catalyst employed in each polymerization was 0.25 parts per hundred part of monomer calculated as titanium. At the end of the polymerization period, which was 2½ hours, at 50° C., the polymerizations were terminated by the addition of alcohol and a suitable antioxidant and the resulting polyisoprene dried under vacuum. The results are set forth in the table below. It is clear that COS is well tolerated by the TIBA·Ph$_2$O-TiCl$_4$ catalyst of 1.0 Al/Ti, a catalyst known to be highly active and selective for the preparation of cis-1,4-polyisoprene.

TABLE 1

1.0 Al/Ti TIBA Φ$_2$O—TiCl control

| COS/Ti* | 2½ hrs. solid conversion | DSV | Percent gel |
|---|---|---|---|
| 0 | 92 | 2.7 | 6 |
| 0.1 | 93 | 2.8 | 9 |
| 0.5 | 94 | 2.6 | 8 |
| 1.0 | 93 | 2.6 | 8 |
| 1.5 | 94 | 2.5 | 11 |

*The molar ratio of COS to all Ti in each experiment.

EXAMPLE II

In this example a series of experiments were performed employing aluminum triisobutyl diphenyl etherate and titanium tetrachloride at a mole ratio of Al/Ti of 1.5/1. Varying amounts of carbon oxysulfide were utilized. Reaction conditions were as detailed in Example I with the exception that the reaction time was 24 hours. The results are set forth in Table 2 which illustrates how COS increases the selectivity of this normally poor catalyst for solid polymer formation and results in lowering the extractables.

TABLE 2

TIBA·Ph$_2$O—TiCl$_4$ of 1.5 Al/Ti

| COS/Ti | Percent solid conversion | Percent extractable conversion |
|---|---|---|
| 0 | 32 | 60 |
| 0.1 | 44 | 38 |
| 0.5 | 68 | 14 |
| 1.0 | 65 | 15 |
| 10.0 | 46 | 11 |
| 50.0 | 17 | 4 |

EXAMPLE III

In this example a series of experiments were performed employing triethylaluminum and titanium tetrachloride at mole ratios of Al/Ti of 1.0/1 and 1.5/1. Varying amounts of carbon oxysulfide were utilized. Reaction conditions were as detailed in Example I with the exception that the reaction time was 24 hours. The results are set forth in Table 3. The increased selectivity towards solid polymer in the presence of COS is quite striking.

TABLE 3

$Et_3Al$—$TiCl_4$ catalysts

| COS/Ti | Percent solid conversion 1.0 Al/Ti | Percent extractable conversion | Percent solid conversion 1.5 Al/Ti | Percent extractable conversion |
|---|---|---|---|---|
| 0 | 27 | 18 | 14 | 68 |
| 0.1 | 56 | 14 | 25 | 42 |
| 0.5 | 58 | 7 | 46 | 11 |
| 1.0 | 56 | 6 | 56 | 9 |
| 10.0 | 15 | 2 | 13 | 1 |
| 50.0 | 4 | 1 | 9 | 1 |

EXAMPLE IV

In this example a series of experiments were performed employing triisobutylaluminum and titanium tetrachloride at mole ratios of Al/Ti of 1.01 and 1.5/1. Varying amounts of carbon oxysulfide were utilized. Reaction conditions were as detailed in Example I with the exception that the reaction time was 24 hours. The results are set forth in Table 4. The increased selectivity towards solid polymer in the presence of COS is again quite striking.

TABLE 4

TIBA—$TiCl_4$ catalysts

| COS/Ti | Percent solid conversion 1.0 Al/Ti | Percent extractable conversion | Percent solid conversion 1.5 Al/Ti | Percent extractable conversion |
|---|---|---|---|---|
| 0 | 72 | 12 | 20 | 68 |
| 0.1 | 75 | 9 | 35 | 33 |
| 0.5 | 74 | 8 | 48 | 16 |
| 1.0 | 71 | 8 | 45 | 13 |
| 10.0 | 36 | 5 | 17 | 4 |
| 50.0 | 7 | 1 | 9 | 2 |

While certain representative embodiments and details have been shown for the purpose of illustrating the invention, it will be apparent to those skilled in this art that various changes and modifications may be made therein without departing from the spirit or scope of the invention.

What is claimed is:

1. The polymerization method which comprises polymerizing at least one conjugated diolefin by means of a catalyst system comprising (A) titanium tetrachloride (B) at least one member of the group consisting of (1) organoaluminum compounds defined by the formula:

wherein $R_1$ is selected from the group consisting of alkyl, cycloalkyl, aryl, alkaryl, arylalkyl and halogen radicals and hydrogen and $R_2$ and $R_3$ are selected from the group consisting of alkyl, cycloalkyl, aryl, arylalkyl and alkaryl radicals and (2) the etherates of organoaluminum compounds of the formula:

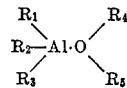

wherein $R_1$ is selected from the group consisting of alkyl, cycloalkyl, aryl, aralkyl, arylalkyl and halogen radicals and hydrogen; $R_2$ and $R_3$ are selected from the group consisting of alkyl, cycloalkyl, aryl, aralkyl, arylalkyl radicals; $R_4$ and $R_5$ are selected from the group consisting of saturated aliphatic, unsaturated aliphatic, saturated alicyclic, unsaturated alicyclic and aromatic radicals and (C) carbon oxysulfide in which the carbon oxysulfide is employed in an amount of about 0.01/1 to about 50/1 moles per mole of titanium in the catalyst system.

2. The method according to claim 1 in which the molar ratio of carbon oxysulfide/aluminum is at least 0.01/1.

3. The method according to claim 1 in which the conjugated diolefin is a 2-alkyl substituted butadiene.

4. The method according to claim 1 in which the 2-alkyl substituted butadiene is isoprene.

5. The method according to claim 1 in which the conjugated diolefin is butadiene.

6. The method according to claim 1 in which the conjugated diolefin is isoprene and wherein the molar ratio of the aluminum/titanium in (A) and (B) is between about 0.7/1 to about 2.0/1.

7. The method according to claim 1 wherein the aromatic etherate of organoaluminum compound is an aromatic etherate of a trialkylaluminum.

8. The method according to claim 1 wherein the aromatic etherate is phenyl etherate.

9. The method according to claim 1 wherein the aromatic etherate is anisolate.

10. The method according to claim 1 wherein the aluminum and titanium portions of the catalyst are preformed separately.

References Cited

UNITED STATES PATENTS

| 3,404,141 | 10/1968 | Owen | 260—94.3 |
| 3,492,281 | 1/1970 | Smith et al. | 260—94.3 |
| 3,317,494 | 5/1967 | Farson | 260—82.1 |
| 3,317,502 | 5/1967 | Harban et al. | 260—93.7 |

OTHER REFERENCES

Korotkov, et al., Chemical Abstracts, vol. 64, 9921f (1966). (Abstract and page from Seventh Collective Index relied on.)

U.S. Cl. X.R.

260—82.1, 94.9 CB; 252—429 B

JOSEPH L. SCHOFER, Primary Examiner

W. F. HAMROCK, Assistant Examiner